(12) United States Patent
Smith et al.

(10) Patent No.: US 9,051,842 B2
(45) Date of Patent: Jun. 9, 2015

(54) SYSTEM AND METHOD FOR COOLING TURBINE BLADES

(75) Inventors: Aaron Ezekiel Smith, Simpsonville, SC (US); Christopher Michael Penny, Greer, SC (US)

(73) Assignee: General Electric Company, Schenectady, NY (US)

( * ) Notice: Subject to any disclaimer, the term of this patent is extended or adjusted under 35 U.S.C. 154(b) by 641 days.

(21) Appl. No.: 13/344,530

(22) Filed: Jan. 5, 2012

(65) Prior Publication Data
US 2013/0177446 A1 Jul. 11, 2013

(51) Int. Cl.
F01D 5/18 (2006.01)
F01D 25/12 (2006.01)

(52) U.S. Cl.
CPC ............... F01D 5/187 (2013.01); F01D 25/12 (2013.01); F05D 2260/202 (2013.01); F01D 5/186 (2013.01); F05D 2230/21 (2013.01); F05D 2250/323 (2013.01); F05D 2250/131 (2013.01); F05D 2240/304 (2013.01); Y02T 50/673 (2013.01); Y02T 50/676 (2013.01)

(58) Field of Classification Search
CPC ......... F01D 5/186; F01D 5/187; F01D 25/12; F05D 2260/201; F05D 2260/202; F05D 2260/204
USPC .......................................... 416/97 R; 415/115
See application file for complete search history.

(56) References Cited

U.S. PATENT DOCUMENTS

| | | | |
|---|---|---|---|
| 5,243,759 A * | 9/1993 | Brown et al. | 29/889.721 |
| 5,246,341 A * | 9/1993 | Hall et al. | 416/97 R |
| 6,129,515 A | 10/2000 | Soechting et al. | |
| 6,325,593 B1 | 12/2001 | Darkins, Jr. et al. | |
| 7,021,893 B2 | 4/2006 | Mongillo, Jr. et al. | |
| 7,387,492 B2 | 6/2008 | Pang et al. | |
| 7,549,844 B2 * | 6/2009 | Liang | 416/97 R |
| 7,762,775 B1 | 7/2010 | Liang | |
| 7,780,414 B1 | 8/2010 | Liang | |
| 7,862,299 B1 * | 1/2011 | Liang | 416/97 R |
| 8,096,770 B2 * | 1/2012 | Liang | 416/97 R |
| 2005/0276697 A1 | 12/2005 | McGrath et al. | |
| 2006/0222494 A1 * | 10/2006 | Liang | 416/97 R |
| 2006/0222496 A1 | 10/2006 | Lee et al. | |
| 2008/0031738 A1 | 2/2008 | Lee | |
| 2011/0085915 A1 | 4/2011 | Krueckels et al. | |
| 2013/0043009 A1 * | 2/2013 | Bunker et al. | 165/104.34 |

FOREIGN PATENT DOCUMENTS

| | | | |
|---|---|---|---|
| EP | 1126135 A2 | 8/2001 | |
| EP | 1698757 A2 | 9/2006 | |

(Continued)

OTHER PUBLICATIONS

Search Report and Written Opinion from EP Application No. 12199287.9 dated Apr. 25, 2013.

(Continued)

Primary Examiner — Ninh H Nguyen
(74) Attorney, Agent, or Firm — Fletcher Yoder P.C.

(57) ABSTRACT

A system includes a turbine blade, which includes at least one cooling slot configured to convey a coolant in a flow direction from an interior to an exterior of the turbine blade. The cooling slot includes an entrance coupled to the interior and a converging section downstream from the entrance. The converging section includes a first cross-sectional area that decreases in the flow direction. The cooling slot also includes an exit disposed along a trailing edge of the turbine blade.

23 Claims, 3 Drawing Sheets

(56) References Cited

FOREIGN PATENT DOCUMENTS

| | | | |
|---|---|---|---|
| EP | 1793083 | A2 | 6/2007 |
| EP | 2267276 | A2 | 12/2010 |
| EP | 2335845 | A1 | 6/2011 |

OTHER PUBLICATIONS

Office Action issued in Chinese Application No. 201310001201.9, mailed Apr. 23, 2015, pp. 1-8.

\* cited by examiner

SYSTEM AND METHOD FOR COOLING TURBINE BLADES

BACKGROUND OF THE INVENTION

The subject matter disclosed herein relates to turbomachinery, and more specifically, to cooling turbine blades.

In general, gas turbine engines combust a mixture of compressed air and fuel to produce hot combustion gases. The combustion gases may flow through one or more turbine stages to generate power for a load and/or compressor. Each turbine stage includes a plurality of turbine blades, which are driven to rotate by the combustion gases. A variety of cooling techniques may be used to cool these turbine blades. Unfortunately, existing cooling techniques may not adequately cool leading or trailing edges of the blades. Furthermore, existing cooling techniques may cause casting problems in the turbine blades.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a turbine blade, which includes at least one cooling slot configured to convey a coolant in a flow direction from an interior to an exterior of the turbine blade. The cooling slot includes an entrance coupled to the interior and a converging section downstream from the entrance. The converging section includes a first cross-sectional area that decreases in the flow direction. The cooling slot also includes an exit disposed along a trailing edge of the turbine blade.

In a second embodiment, a system includes a rotary blade. The rotary blade includes a leading edge, a trailing edge, a pressure sidewall, a suction sidewall, a cooling cavity disposed between the pressure sidewall and the suction sidewall, and a plurality of cooling slots coupled to cooling cavity. The plurality of cooling slots is configured to pass a coolant in a flow direction through the trailing edge. Each of the plurality of cooling slots includes a converging section, a metering section coupled to the converging section, and an exit disposed along the trailing edge. The converging section includes a first cross-sectional area that decreases in the flow direction. The metering section includes a second cross-sectional area that is substantially constant in the flow direction.

In a third embodiment, a method includes forming a ceramic turbine blade core, inserting the core into a die, and casting a turbine blade between the core and the die with a pressure sidewall and a suction sidewall coupled together at a leading edge and a trailing edge. The turbine blade includes a plurality of cooling slots configured to pass a coolant in a flow direction through the trailing edge. Each of the plurality of cooling slots includes a converging section, a metering section coupled to the converging section, and an exit disposed along the trailing edge. The converging section includes a first cross-sectional area that decreases in the flow direction. The metering section includes a second cross-sectional area that is substantially constant in the flow direction.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
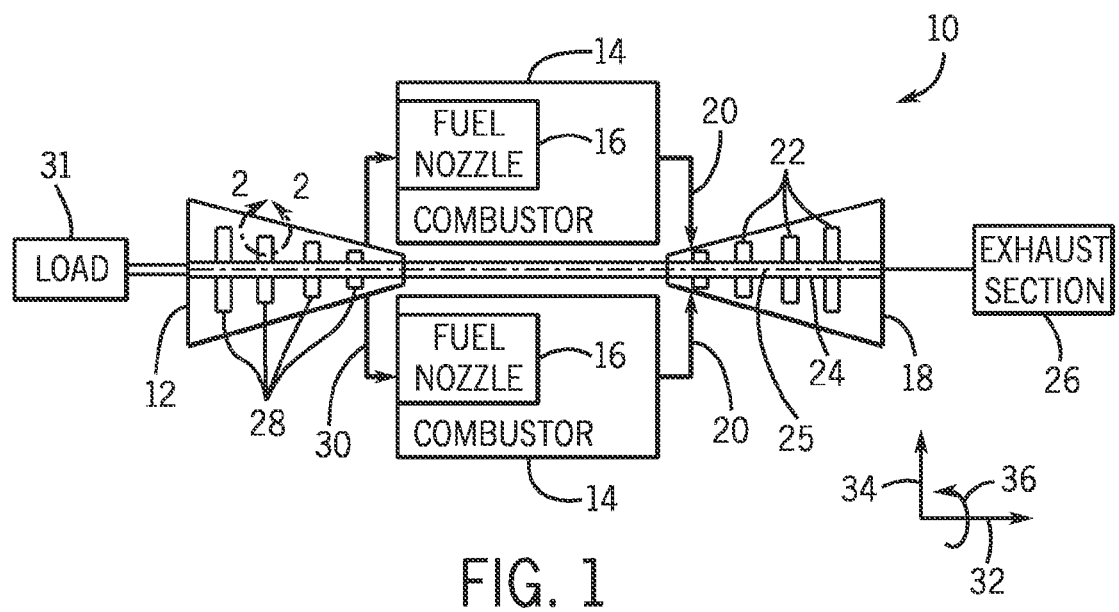
FIG. 1 is a schematic diagram of an embodiment of a gas turbine system including a turbine having turbine blades with cooling slots.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed below, certain embodiments of the present disclosure provide a turbomachine that includes turbomachine blades (e.g., rotary blades or airfoils) with enhanced aerodynamic performance, improved durability, and/or improved longevity. For example, the turbomachine may be a turbine, such as a gas turbine or a steam turbine, having turbine blades. In other embodiments, the turbomachine may be a compressor or other turbomachine. In one embodiment, a turbine blade may include a cooling slot configured to convey a coolant. For example, the coolant may flow through the turbine blade to provide convective cooling and/or film cooling of surfaces of the turbine blade. The cooling slot may include an entrance disposed in the turbine blade, a converging section coupled to the entrance, a metering section coupled to the converging section, and an exit disposed in a trailing edge of the turbine blade. In certain embodiments, the converging section may include a first cross-sectional area, which decreases from an upstream side to a downstream side of the cooling slot. In other words, the converging section narrows from the upstream side to the downstream side of the cooling slot. The metering section may include a second cross-sectional area, which is constant from the upstream side to the downstream side of the cooling slot.

The narrowing of the converging section may cause an increase in a velocity of the coolant flowing through the cooling slot. This increase in coolant velocity may increase the heat transfer near the downstream side of the cooling slot, thereby reducing temperatures near the downstream end of the trailing edge of the turbine blade and increasing the longevity of the turbine blade. In further embodiments, a method may include forming a substantially solid ceramic airfoil core, inserting the core into a die, and casting the airfoil with a pressure sidewall and a suction sidewall coupled together at a leading edge and a trailing edge. The airfoil may include a plurality of cooling slots extending from the trailing edge of the airfoil. In addition, each of the plurality of cooling slots may include a converging section, a metering section coupled to the converging section, and an exit disposed in the trailing edge. The first cross-sectional area of the converging section may decrease from the upstream side to the downstream side of the cooling slot, and the second cross-sectional area of the metering section may be constant from the upstream side to the downstream side of the cooling slot. The converging shape of the cooling slot of the casting may increase the strength of the casting, thereby decreasing a frequency of casting failures. In this manner, the durability and/or longevity of the turbine blade may also be improved.

Turning now to the drawings, FIG. 1 illustrates a block diagram of an embodiment of a gas turbine system 10 having turbine blades 22 with cooling slots. The system 10 includes a compressor 12, combustors 14 having fuel nozzles 16, and a turbine 18. The fuel nozzles 16 route a liquid fuel and/or gas fuel, such as natural gas or syngas, into the combustors 14. The combustors 14 ignite and combust a fuel-air mixture, and then pass hot pressurized combustion gases 20 (e.g., exhaust) into the turbine 18. Turbine blades 22 are coupled to a rotor 24, which is also coupled to several other components throughout the turbine system 10, as illustrated. As the combustion gases 20 pass through the turbine blades 22 in the turbine 18, the turbine 18 is driven into rotation, which causes the rotor 24 to rotate along a rotational axis 25. Eventually, the combustion gases 20 exit the turbine 18 via an exhaust outlet 26.

In the illustrated embodiment, the compressor 12 includes compressor blades 28. The blades 28 within the compressor 12 are coupled to the rotor 24, and rotate as the rotor 24 is driven into rotation by the turbine 18, as discussed above. As the blades 28 rotate within the compressor 12, the blades 28 compress air from an air intake into pressurized air 30, which may be routed to the combustors 14, the fuel nozzles 16, and other portions of the gas turbine system 10. The fuel nozzles 16 may then mix the pressurized air and fuel to produce a suitable fuel-air mixture, which combusts in the combustors 14 to generate the combustion gases 20 to drive the turbine 18. Further, the rotor 24 may be coupled to a load 31, which may be powered via rotation of the rotor 24. By way of example, the load 31 may be any suitable device that may generate power via the rotational output of the turbine system 10, such as a power generation plant or an external mechanical load. For instance, the load 31 may include an electrical generator, a propeller of an airplane, and so forth. In the following discussion, reference may be made to various directions, such as an axial direction or axis 32, a radial direction or axis 34, and a circumferential direction or axis 36 of the turbine 18.

Figure 2:
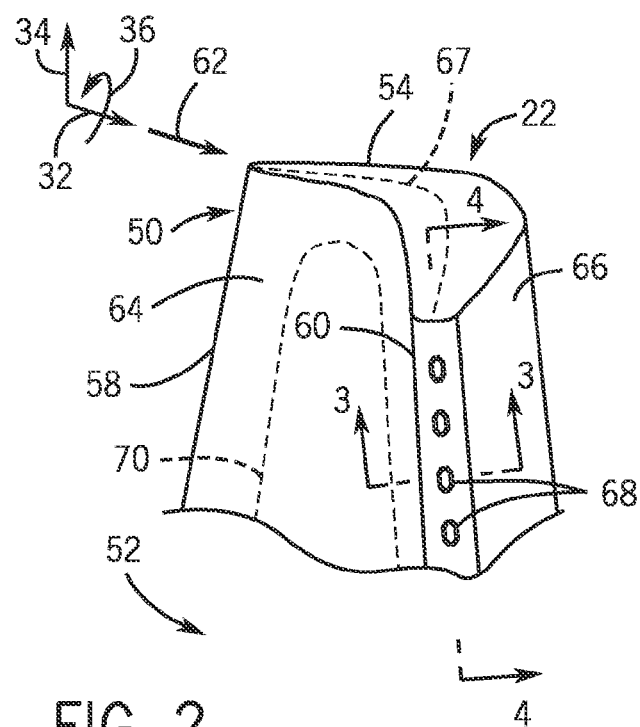
FIG. 2 is a perspective view of an embodiment of a turbine blade having cooling slots.

FIG. 2 is a perspective view of an embodiment of the turbine blade 22. In the illustrated embodiment, the turbine blade 22 includes a blade tip 50 and a blade root 52. The blade root 52 of the turbine blade 22 may be coupled to the rotor 24 of turbine 18. Additionally, the turbine blade 22 may include a blade tip surface 54. The turbine blade 22 also includes a leading edge 58 and a trailing edge 60. As shown in FIG. 2, the leading edge 58 and the trailing edge 60 extend generally radially 34 from the blade tip surface 54 toward the blade root 52. In addition, gases 62 may flow axially 32 toward the leading edge 58 of the turbine blade 22. The turbine blade 22 also includes a concave pressure sidewall 64 and a convex suction sidewall 66 joined together at the leading edge 58 and the trailing edge 60. A chord line 67 shown in FIG. 2 is a reference line extending from the leading edge 58 to the trailing edge 60 that connects the approximate midpoints between the pressure sidewall 64 and the suction sidewall 66. The turbine blade 22 includes a plurality of cooling slot exits 68 disposed along the trailing edge 60. The plurality of cooling slot exits 68 may be in flow communication with an internal cooling cavity 70 disposed within the turbine blade 22. For example, the cavity 70 may be disposed in an interior of the turbine blade 22. The cooling cavity 70 may flow a coolant through the cooling slot exits 68 out to an exterior of the turbine blade 22 to provide for cooling of the turbine blade. The coolant may be air or any other coolant selected to provide for cooling within the gas turbine system 10. As shown in FIG. 2, the cooling slot exits 68 are disposed entirely within (or directly along) the trailing edge 60. In other words, the cooling slot exits 68 are not disposed on the pressure sidewall 64 or the suction sidewall 66. The trailing edge 60 may receive little convective cooling from the cooling cavity 70 because of the distance between the trailing edge 60 and the cooling cavity 70. Thus, the cooling slot exits 68 may provide for direct cooling of the trailing edge 60 because of the location of the cooling slot exits 68 directly at the trailing edge 60.

Figure 3:
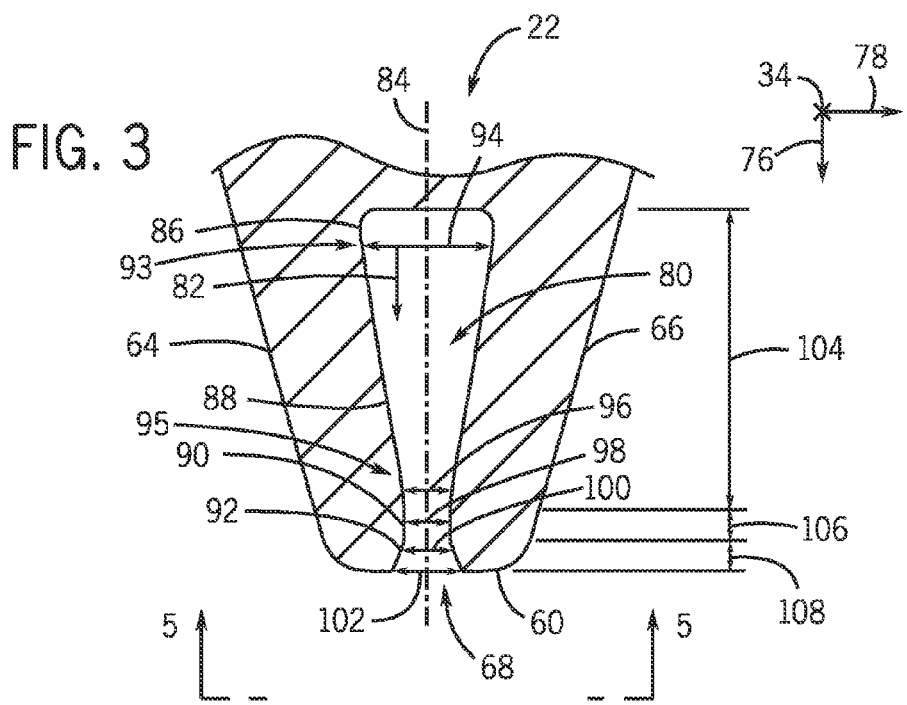
FIG. 3 is a cross-sectional axial view of an embodiment of a turbine blade having cooling slots, taken along line 3-3 of FIG. 2.

FIG. 3 is a cross-sectional axial view of an embodiment of the turbine blade 22 along the line labeled 3-3 in FIG. 2. In the following discussion, reference may be made to various directions, such as a longitudinal direction or axis 76 and a transverse direction or axis 78 of the trailing edge 60 of the turbine blade 22. In the illustrated embodiment, a cooling slot 80 may be disposed within the turbine blade 22. Coolant may flow in the direction of arrow 82 toward the trailing edge 60. In addition, the cooling slot 80 may be symmetrical about a midline 84 of the trailing edge 60. The midline 84 may be generally aligned with the longitudinal axis 76 and/or the chord line 67. As shown in FIG. 3, the cooling slot 80 may be coupled to the cooling cavity 70 disposed within the turbine blade 22. As discussed above, the cooling cavity 70, or entrance, may carry the coolant to each of the plurality of cooling slots 80 disposed within the turbine blade 22. Specifically, the cavity 70 may be coupled to the interior of the turbine blade 22. Each of the cooling slots 80 may include several sections. Specifically, a converging section (or contracting section) 88 may be downstream from and coupled to the cooling cavity 70. In other words, as the coolant flows in the direction of arrow 82 (i.e., the flow direction) through the converging section 88, the cooling slot 80 converges or contracts. In addition, a metering section 90 may be downstream from and coupled to the converging section 88. Finally, an expanding section (or diverging section) 92 may be coupled to the metering section 90 and the cooling slot exit 68 of the cooling slot 80. As the coolant flows in the direction of arrow 82 through the diverging section 92, the cooling slot 80 expands or diverges. In certain embodiments, the expanding section 92 may be omitted.

In the illustrated embodiment, the converging section 88 includes a first cross-sectional area that decreases from an upstream side 93 to a downstream side 95 of the cooling slot 80. In other words, the first cross-sectional area decreases in the flow direction 82. For example, an upstream width 94 may be greater than a downstream width 96 of the converging section 88. In other words, the converging section 88 narrows from the upstream side 93 to the downstream side 95. Thus, a velocity of the coolant flowing in the direction 82 may increase through the converging section 88. In the illustrated embodiment, the metering section 90 may be characterized by a metering section width 98, which may be approximately the same or less than the downstream width 96 of the converging section 88. As shown in FIG. 3, the metering section width 98, and accordingly a second cross-sectional area of the metering section 98, may be constant. In other words, the metering section width 98, and accordingly the second cross-sectional area, is substantially constant in the flow direction 82. The metering section 90 may be used to adjust a flow rate of the coolant flowing through the cooling slot 80. For example, a metering section 90 with a smaller metering section width 98 may reduce the flow rate of the coolant. Similarly, a larger metering section width 98 may enable a higher coolant flow rate through the cooling slot 80. The expanding section 92 may be defined by an expanding section width 100, which may be greater than the metering section width 98. The expanding section 92 includes a third cross-sectional area that increases in the flow direction 82. In addition, the expanding section 92 may provide for a wider or more distributed flow of the coolant along the trailing edge 60. The cooling slot exit 68 may be defined by a cooling slot opening width 102, which may be greater than the expanding section width 100.

As shown in FIG. 3, the converging section 88 may be defined by a converging section length 104, the metering section 90 may be defined by a metering section length 106, and the expanding section 92 may be defined by an expanding section length 108. In the illustrated embodiment, the converging section length 104 is greater than the metering section length 106. In certain embodiments, a ratio of the converging section length 104 to the metering section length 106 may be between approximately 1.1:1 to 10:1, 2:1 to 8:1, or 4:1 to 6:1. A longer converging section length 104 may enable the coolant velocity to gradually increase through the converging section 88 to provide for improved heat transfer moving toward the trailing edge 60. The metering section length 106 may be used together with the metering section width 98 to adjust a flow rate of the coolant exiting from the cooling slot 80. The expanding section length 108 may be selected to provide for even distribution of the coolant across the trailing edge 60. In addition, although the cooling slot 80 is shown symmetrical about the midline 84, in other embodiments, the cooling slot 80 may not be symmetrical about the midline 84. For example, the cooling slot 80 may be oriented to direct the coolant more toward the pressure sidewall 64 or more toward the suction sidewall 66. In other words, the cooling slots 80 may not be aligned exactly with the longitudinal axis 76 in certain embodiments.

Figure 4:
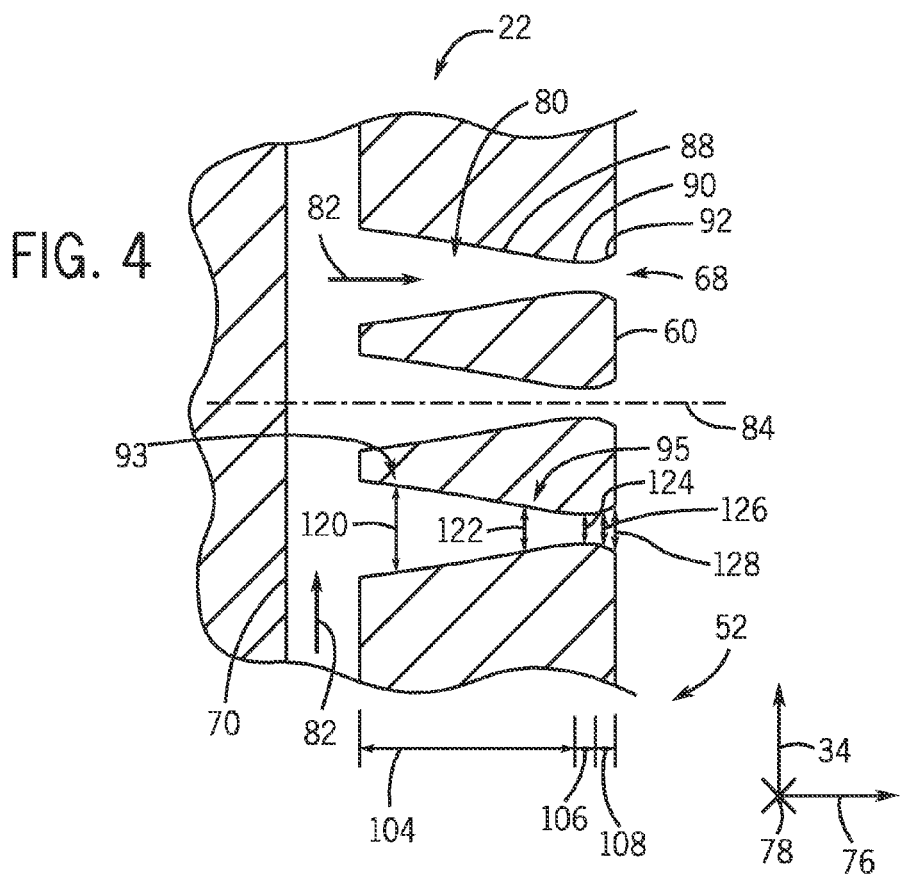
FIG. 4 is a cross-sectional radial view of an embodiment of a turbine blade having cooling slots, taken along line 4-4 of FIG. 2.

FIG. 4 is a cross-sectional radial view of an embodiment of the turbine blade 22 along the line labeled 4-4 in FIG. 2. In the illustrated embodiment, the cooling cavity 70 connects several of the cooling slots 80, enabling the coolant to flow in the direction 82 through each of the cooling slots 80. As shown in FIG. 4, the converging section 88 includes a cross-sectional area that decreases from the upstream side 93 to the downstream side 95. Thus, the converging section 88 narrows in two dimensions, namely the transverse direction 78 and the radial direction 34. Thus, the converging section 88 may include an upstream height 120 and a downstream height 122. As shown in FIG. 4, the upstream height 120 is greater than the downstream height 122. In other words, the converging section 88 narrows from the upstream side 93 to the downstream side 95 in the radial direction 34. In certain embodiments, the upstream height 120 may be approximately the same as the upstream width 94 and the downstream height 122 may be approximately the same as the downstream width 96. In other words, the converging section 88 may narrow the same amount in both the transverse direction 78 and the radial direction 34. Thus, the converging section 88 may be a conical passage. In other embodiments, the upstream height 120 may be different from the upstream width 94 and/or the downstream height 122 may be different from the downstream width 96. In other words, the converging section 88 may narrow to a different degree in the circumferential direction 36 than in the radial direction 34.

As shown in FIG. 4, the metering section 90 includes a metering section height 124, which may be the same or different from the metering section width 98. In addition, the expanding section 92 may include an expanding section height 126, which may be the same or different from the expanding section width 100. Finally, the exit 68 may include an opening height 128, which may be the same or different from the opening width 102. In certain embodiments, the converging section 88 may converge only in one dimension. In other words, the converging section 88 may converge only in the transverse direction 78 or only in the radial direction 34. However, as discussed in detail below, the casting strength may be increased when the converging section 88 converges in both the transverse direction 78 and the radial direction 34, or generally in two dimensions. Further, although the cooling slot 80 is shown symmetrical about the midline 84 (e.g., a conical cooling slot 80), in other embodiments, the cooling slot 80 may not be symmetrical about the midline 84. For example, the cooling slot 80 may be oriented to direct the coolant more toward the blade tip surface 54 (e.g., angled up) or more toward the blade root 52 (e.g., angled down). In other words, the cooling slots 80 may not be aligned exactly with the longitudinal axis 76 in certain embodiments.

Figure 5:
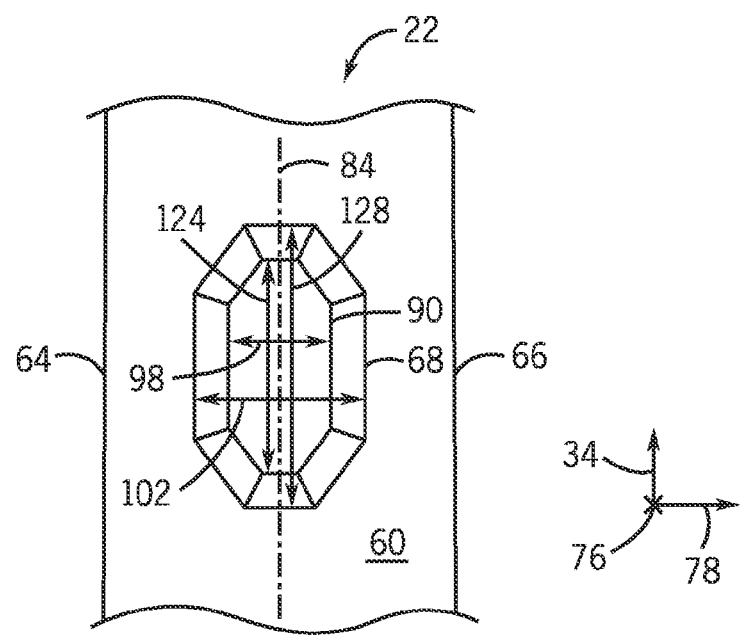
FIG. 5 is a perspective view of an embodiment of a cooling slot, taken along line 5-5 of FIG. 3.

FIG. 5 is a perspective view of an embodiment of the turbine blade 22 showing the exit 68 of the cooling slot 80. As shown in FIG. 5, the exit 68 is disposed along the midline 84 of the trailing edge 60, which may be generally aligned with the radial axis 34. In addition, the outlines of both the metering section 90 and the exit 68 may be visible from the perspective view of the turbine blade 22 shown in FIG. 5. Examples of shapes of the exit 68 include, but are not limited to, circles, ovals, squares, rectangles, polygons, and so forth. In the illustrated embodiment, the metering section height 124 is greater than the metering section width 98. Similarly, the opening height 128 is greater than the opening width 102. In other embodiments, the heights 124 and 128 may be approximately the same as the widths 98 and 102. In further embodiments, the heights 124 and 128 may be less than the widths 98 and 102. In addition, the exit 68 of the cooling slot 80 is disposed between the pressure sidewall 64 and the suction sidewall 66. Thus, the exit 68 does not extend onto the pressure sidewall 64 or the suction sidewall 66. This configuration of the exit 68 may increase the amount of cooling provided to the trailing edge 60.

Figure 6:
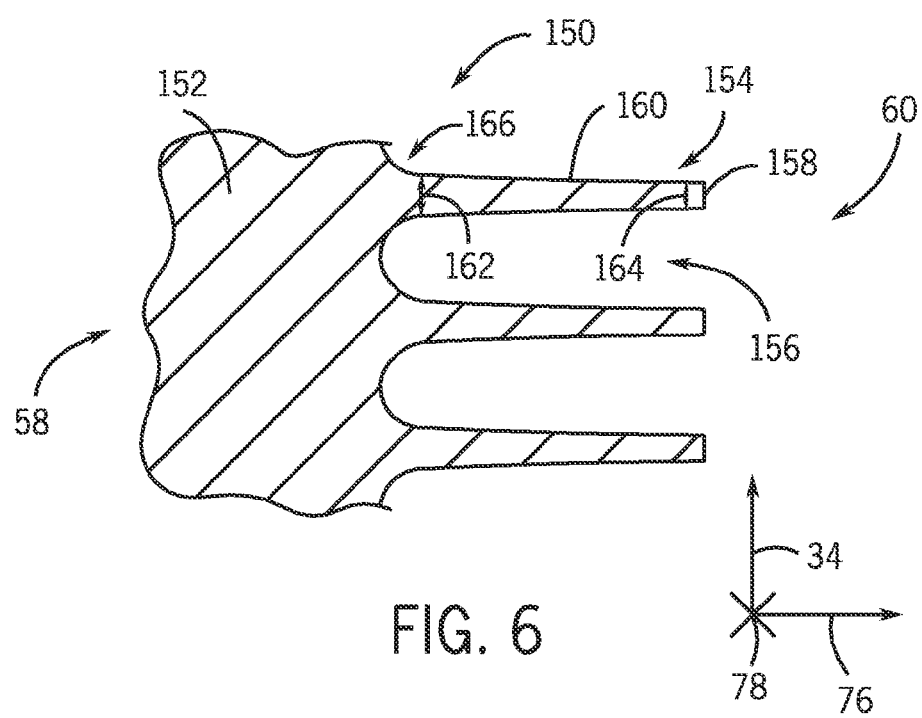
FIG. 6 is a cross-sectional radial view of an embodiment of a core used to manufacture a turbine blade with cooling slots.

FIG. 6 is a cross-sectional radial view of an embodiment of a core 150 used in the manufacture of the turbine blade 22. In one embodiment, the turbine blades 22, or airfoils, may be fabricated by casting the core 150. For example, the core 150 may be fabricated by injecting a liquid, such as a liquid ceramic and graphite slurry, into a core die (not shown). The liquid may then be heated to form the solid ceramic airfoil core 150. The airfoil core 150 may then be suspended in an airfoil die (not shown) and hot wax injected into the airfoil die to surround the ceramic airfoil core 150. The hot wax then solidifies and forms a wax airfoil with the ceramic core 150 suspended in the airfoil. The wax airfoil with the ceramic core 150 may then be repeatedly dipped into a ceramic slurry to form a ceramic shell outside the wax airfoil. The core 150, wax, and shell cluster may then be heated to an elevated temperature to remove the wax to form a casting mold with the ceramic core 150 in the middle. Molten metal may then be poured into the hollow casting mold. The molten metal takes the place of the wax airfoil, and forms the metal airfoil 22 with the ceramic core 150 remaining in place. The airfoil 22 is then cooled, and the ceramic core 150 removed.

As shown in FIG. 6, a bulk portion 152 of the core 150 may correspond to the cooling cavity 70 and extensions 154 may correspond to the cooling slots 80. Spaces 156 between the extensions 154 may correspond to the structure between the cooling slots 80 of the turbine blade 22. Ends 158 of the extensions 154 may correspond to the narrowest end, or downstream side 95, of the converging section 88 of the turbine blade 22. Thus, the metering section 90 and the expanding section 92 may be formed in the turbine blade 22 by drilling or cutting through the turbine blade 22 after removing the core 150. A converging portion 160 of the extensions 154 may correspond to the converging section 88 of the cooling slot 80 of the turbine blade 22. An upstream height 162 may correspond to the upstream height 120 and a downstream height 164 may correspond to the downstream height 122 of the converging section 88 of the turbine blade 22. As shown in FIG. 6, the portion of the extension 154 attached to the bulk portion 152, i.e., an extension base 166, is wider than the ends 158 of the extensions 154. Thus, the extensions 154 may be less prone to cracking or breaking away from the bulk portion 152 during manufacturing of the turbine blade 22 because of the increased strength of the extension bases 166.

As discussed above, embodiments of the turbine blades 22 include a cooling slot 80 that facilitates extending a useful life of the turbine blade 22. Specifically, the turbine blades 22 may include a plurality of cooling slots 80 that include the entrance 70, the converging section 88 coupled to the entrance 70, the metering section 90 coupled to the converging section 88, and the exit 68 disposed in the trailing edge 60 of the turbine blade 22. The first cross-sectional area of the converging section 88 decreases from upstream side 93 to the downstream side 95 of the cooling slot 80. The second cross-sectional area of the metering section 90 may be constant from the upstream side 93 to the downstream side 95 of the cooling slot. The cooling slots 80 facilitate enhanced cooling and flow regulation with improved manufacturing yields. As a result, the trailing edge cooling slot geometry configuration of the turbine blades 22 facilitates extending a useful life of the turbine blades 22 in a cost-effective and reliable manner. Exemplary embodiments of turbine blades 22 are described above in detail. The turbine blades 22 may be disposed on rotating surfaces of the gas turbine system 10, such as a rotor, on stationary surfaces, such as a stator, or both the rotor and stator. The cooling slots 80 described above are not limited to use with the specific embodiments of turbine blades 22 described herein, but rather, the cooling slots 80 may be utilized independently and separately from other rotor or stator components described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:
1. A system, comprising:
a turbine blade comprising at least one cooling slot configured to convey a coolant in a flow direction from an interior to an exterior of the turbine blade, wherein the cooling slot comprises:
an entrance coupled to the interior;
a converging section downstream from the entrance, wherein the converging section comprises a first cross-sectional area that decreases in the flow direction; and
an exit disposed along a trailing edge of the turbine blade, wherein the cooling slot comprises at least one of:
only one metering section, wherein the metering section is disposed only downstream from the converging section; or
the exit of the cooling slot is disposed along the trailing edge on a midline between a pressure sidewall and a suction sidewall, wherein the exit comprises a diverging section; or
a combination thereof.

2. The system of claim 1, comprising the only one metering section, wherein the metering section is disposed only downstream from the converging section.

3. The system of claim 2, wherein the converging section comprises a first length in the flow direction, the metering section comprises a second length in the flow direction, and the first length is greater than the second length.

4. The system of claim 2, wherein the metering section comprises a second cross-sectional area that is substantially constant in the flow direction.

5. The system of claim 1, wherein the exit is disposed along the trailing edge on the midline between the pressure sidewall and the suction sidewall, wherein the exit comprises the diverging section.

6. The system of claim 5, wherein the diverging section comprises a third cross-sectional area that increases in the flow direction.

7. The system of claim 1, wherein the converging section comprises a height and a width, wherein both the height and the width decrease in the flow direction.

8. The system of claim 7, wherein the height and the width are different from one another.

9. The system of claim 1, wherein a cross-sectional shape of the converging section comprises at least one of a circle, an oval, a square, a rectangle, or a polygon, or a combination thereof.

10. The system of claim 1, comprising a turbine having the turbine blade.

11. The system of claim 1, wherein the cooling slot is symmetrical about the midline between the pressure sidewall and the suction sidewall.

12. The system of claim 1, wherein the cooling slot comprises:
the metering section disposed only downstream from the converging section; and
the exit disposed along the trailing edge on the midline between the pressure sidewall and the suction sidewall.

13. A system, comprising:
a rotary blade, comprising:
a leading edge;
a trailing edge;
a pressure sidewall;
a suction sidewall;
a cooling cavity disposed between the pressure sidewall and the suction sidewall; and a plurality of cooling slots coupled to cooling cavity, wherein the plurality of cooling slots is configured to pass a coolant in a flow direction through the trailing edge, and each slot of the plurality of cooling slots comprises:
   a converging section comprising a first cross-sectional area that decreases in the flow direction;
   only one metering section, wherein the metering section is coupled to the converging section, wherein the metering section is disposed only downstream from the converging section, and the metering section comprises a second cross-sectional area that is substantially constant in the flow direction; and
   an exit disposed along the trailing edge on a midline between the pressure sidewall and the suction sidewall, wherein the exit comprises a diverging section.

14. The system of claim 13, wherein the exit is centered directly on the midline.

15. The system of claim 13, wherein each converging section comprises a height and a width, wherein both the height and the width decrease in the flow direction.

16. The system of claim 13, wherein each converging section comprises a first length in the flow direction, each metering section comprises a second length in the flow direction, and a ratio of the first length to the second length is greater than approximately 5:1.

17. The system of claim 13, wherein the diverging section comprises a third cross-sectional area that increases in the flow direction.

18. The system of claim 13, comprising a turbomachine having the rotary blade, wherein the rotary blade is disposed on a rotor.

19. A method, comprising:
   forming a ceramic turbine blade core;
   inserting the core into a die; and
   casting a turbine blade between the core and the die with a pressure sidewall and a suction sidewall coupled together at a leading edge and a trailing edge, wherein the turbine blade comprises a plurality of cooling slots configured to pass a coolant in a flow direction through the trailing edge, and each slot of the plurality of cooling slots comprises:
      a converging section comprising a first cross-sectional area that decreases in the flow direction;
      a metering section coupled to the converging section; and
      an exit disposed along the trailing edge, wherein each slot of the plurality of cooling slots comprises at least one of:
         only the one metering section, wherein the metering section is disposed only downstream from the converging section; or
         the exit is disposed along the trailing edge on a midline between the pressure sidewall and the suction sidewall, wherein the exit comprises a diverging section; or
         a combination thereof.

20. The method of claim 19, wherein the exit is disposed along the trailing edge on the midline between the pressure sidewall and the suction sidewall, wherein the exit is centered on the midline.

21. The method of claim 19, wherein the first cross-sectional area of the converging section decreases in at least two dimensions.

22. The method of claim 19, wherein the converging section comprises a first length in the flow direction, the metering section comprises a second length in the flow direction, and the first length is greater than the second length.

23. The method of claim 19, wherein the metering section is disposed between the converging section and the diverging section.

* * * * *